(12) United States Patent
Moyer et al.

(10) Patent No.: US 9,395,983 B2
(45) Date of Patent: *Jul. 19, 2016

(54) DEBUG INSTRUCTION FOR EXECUTION BY A FIRST THREAD TO GENERATE A DEBUG EVENT IN A SECOND THREAD TO CAUSE A HALTING OPERATION

(75) Inventors: William C. Moyer, Dripping Springs, TX (US); Michael D. Snyder, Cedar Park, TX (US); Gary L. Whisenhunt, Leander, TX (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 1472 days.

This patent is subject to a terminal disclaimer.

(21) Appl. No.: 12/195,220

(22) Filed: Aug. 20, 2008

(65) Prior Publication Data

US 2010/0049955 A1    Feb. 25, 2010

(51) Int. Cl.
| G06F 15/00 | (2006.01) |
| G06F 7/38  | (2006.01) |
| G06F 9/00  | (2006.01) |
| G06F 9/44  | (2006.01) |
| G06F 9/30  | (2006.01) |
| G06F 11/36 | (2006.01) |

(52) U.S. Cl.
CPC ............ *G06F 9/3005* (2013.01); *G06F 9/3009* (2013.01); *G06F 11/3648* (2013.01)

(58) Field of Classification Search
None
See application file for complete search history.

(56) References Cited

U.S. PATENT DOCUMENTS

| 6,189,140 | B1 * | 2/2001  | Madduri ................. 717/128 |
| 6,219,782 | B1 * | 4/2001  | Khan et al. ............. 712/227 |
| 6,295,600 | B1 * | 9/2001  | Parady .................. 712/228 |
| 6,480,818 | B1   | 11/2002 | Alverson et al. |
| 6,848,097 | B1   | 1/2005  | Alverson et al. |
| 7,010,669 | B2   | 3/2006  | Burns et al. |
| 7,020,871 | B2   | 3/2006  | Bernstein et al. |
| 7,770,179 | B1 * | 8/2010  | James-Roxby et al. ...... 719/312 |
| 2003/0093655 | A1 * | 5/2003  | Gosior et al. ............ 712/228 |
| 2004/0205747 | A1 * | 10/2004 | Bernstein et al. ......... 717/174 |
| 2005/0246691 | A1   | 11/2005 | Hsieh et al. |
| 2005/0289396 | A1 * | 12/2005 | Hooper et al. ............ 714/34 |
| 2006/0069959 | A1   | 3/2006  | Schultz |
| 2006/0282707 | A1   | 12/2006 | Rosenbluth et al. |
| 2007/0168968 | A1   | 7/2007  | Bates et al. |
| 2007/0168985 | A1 * | 7/2007  | Konishi et al. .......... 717/124 |
| 2007/0220334 | A1   | 9/2007  | Pedersen et al. |
| 2008/0115113 | A1   | 5/2008  | Codrescu et al. |

FOREIGN PATENT DOCUMENTS

WO      2006070510 A1     3/2006

OTHER PUBLICATIONS

Schulz et al., A Thread-Aware Debugger with an Open Interface, Sep. 2000, pp. 201-211.*

(Continued)

*Primary Examiner* — George Giroux

(57) ABSTRACT

For use in a data processing system comprising a processor configured to execute a first set of instructions corresponding to a first thread and a second set of instructions corresponding to a second thread, a method is provided. The method comprises in response to execution of a debug related instruction by the first thread while executing the first set of instructions, generating a debug event for processing by the second thread, wherein processing the debug event comprises causing a halting operation related to the processor.

24 Claims, 4 Drawing Sheets

```
dnht   dui, thread-select 0        5 6      10 11    15 16    20 21             30 31
|0 1 0 0 1 1|  dui  |0|0| thread_select |   sub-opcode   |0|
```

(56) References Cited

OTHER PUBLICATIONS

International Search Report and Written Opinion mailed Dec. 30, 2009 on Corresponding PCT Application.
U.S. Appl. No. 11/871,847, filed Oct. 12, 2007.
Office Action mailed Dec. 22, 2010 in U.S. Appl. No. 12/195,225.
Final Office Action mailed Jun. 13, 2011 in U.S. Appl. No. 12/195,225.
Office Action mailed Oct. 7, 2011 in U.S. Appl. No. 12/195,225.
Final Rejection mailed Mar. 29, 2012 in U.S. Appl. No. 12/195,225.
"Errata to the Power PC e500 Core Family Reference Manual, Rev. 1", Freescale Semiconductor, Inc., 2006, 12 pages.
"ST, UM0434 e200z3 PowerPC core Reference manual", Revision 1, www.st.com, May 2007, p. 109.

* cited by examiner

| BITS | NAME | DESCRIPTION |
|---|---|---|
| 0 | EDM | EXTERNAL DEBUG MODE.<br>0 INDICATES THE PROCESSOR IS NOT IN EXTERNAL DEBUG MODE. EXTERNAL DEBUG EVENTS ARE DISABLED.<br>1 INDICATES THE PROCESSOR IS IN EXTERNAL DEBUG MODE. A QUALIFIED DEBUG CONDITION WILL GENERATE AN EXTERNAL DEBUG EVENT BY UPDATING THE CORRESPONDING BIT IN THE EDBSR0 AND CAUSE THE PROCESSOR TO HALT. SETTING THIS BIT TAKES PRECEDENCE OVER DBCR0[IDM]. |
| 1 | DNH_EN | DEBUGGER NOTIFY HALT ENABLE<br>0 INDICATES THE DEBUGGER NOTIFY HALT (dnh) INSTRUCTION WILL RESULT IN AN ILLEGAL INSTRUCTION EXCEPTION.<br>1 INDICATES THE DEBUGGER NOTIFY HALT (dnh) INSTRUCTION WILL CAUSE THE PROCESSOR TO HALT. |
| 2 | DNHT_EN | DEBUGGER NOTIFY HALT THREAD(S) ENABLE<br>0 INDICATES THE DEBUGGER NOTIFY HALT THREAD(S) (dnht) INSTRUCTION WILL RESULT IN A DEBUG EXCEPTION.<br>1 INDICATES THE DEBUGGER NOTIFY HALT THREAD(S) (dnht) INSTRUCTION WILL CAUSE THE PROCESSOR TO PERFORM A HALTING OPERTION, BASED ON SETTINGS OF DNHT_CTL. |
| 3:4 | DNHT_CTL | DEBUGGER NOTIFY HALT THREAD(S) ACTION CONTROL<br>00 -INDICATES THAT ANY SET BIT IN DNHTDEVTR0 WILL CAUSE THE PROCESSOR TO HALT.<br>01 -INDICATES THAT A SET BIT IN DNHTDEVTR0 WILL CAUSE THE PROCESSOR TO HALT WHEN THE CORRESPONDING THREAD IS ACTIVE OR BECOMES ACTIVE.<br>10 -INDICATES THE DEBUGGER NOTIFY HALT THREAD(S) (dnht) INSTRUCTION WILL CAUSE THE PROCESSOR TO SUSPEND NORMAL THREAD ACTIVATION OF A THREAD WHOSE FLAG BIT IS SET IN DNHTDEVTR0 AND WILL INSTEAD NOTIFY THE EXTERNAL DEBUGGER OF THE EVENT AT THE TIME THE THREAD WOULD HAVE BEEN ACTIVATED. IF THE THREAD IS CURRENTLY ACTIVE, IT BECOMES DORMANT, AND THE DEBUGGER IS NOTIFIED. THE PROCESSOR CONTINUES TO REMAIN ACTIVE FOR ALL THREADS WHICH DO NOT HAVE THEIR CORESSPONDING FLAG BIT SET IN DNHTDEVTR0.<br>11 -RESERVED. |
| 5:31 | – | RESERVED, SHOULD BE CLEARED. |

*FIG. 6* dnht    dui, thread-select

| 0 | 5 | 6 | 10 | 11 | | 15 | 16 | 20 | 21 | 30 | 31 |
|---|---|---|----|----|---|----|----|----|----|----|----|
| 0 1 0 0 1 1 | | dui | | 0 | 0 | thread_select | | | sub-opcode | | 0 |

| 0 | 23 | 24 | 25 | 26 | 27 | 28 | 29 | 30 | 31 |
|---|----|----|----|----|----|----|----|----|----|
| – | | evnt_thread7 | evnt_thread6 | evnt_thread5 | evnt_thread4 | evnt_thread3 | evnt_thread2 | evnt_thread1 | evnt_thread0 |

FIG. 8

| BITS | NAME | DESCRIPTION |
|------|------|-------------|
| 0:23 | – | RESERVED |
| 24 | evnt_thread7 | THREAD 7 EVENT CONTROL<br>0  NO THREAD 7 EVENT HAS BEEN POSTED<br>1  A THREAD 7 EVENT HAS BEEN POSTED |
| 25 | evnt_thread6 | THREAD 6 EVENT CONTROL<br>0  NO THREAD 6 EVENT HAS BEEN POSTED<br>1  A THREAD 6 EVENT HAS BEEN POSTED |
| ⋮ | | |
| 31 | evnt_thread0 | THREAD 0 EVENT CONTROL<br>0  NO THREAD 0 EVENT HAS BEEN POSTED<br>1  A THREAD 0 EVENT HAS BEEN POSTED |

FIG. 9

DEBUG INSTRUCTION FOR EXECUTION BY A FIRST THREAD TO GENERATE A DEBUG EVENT IN A SECOND THREAD TO CAUSE A HALTING OPERATION

CROSS-REFERENCE TO RELATED APPLICATION(S)

This application is related to U.S patent application Ser. No. 12/195,225, filed on even date, entitled "DEBUG INSTRUCTION FOR USE IN A MULTI-THREADED DATA PROCESSING SYSTEM," naming William C. Moyer, Michael D. Snyder, and Gary L. Whisenhunt as inventors, and assigned to the current assignee hereof.

BACKGROUND

1. Field

This disclosure relates generally to data processing systems, and more specifically, to a debug instruction for use in a multi-threaded data processing system.

2. Related Art

Multi-threaded data processors allow multiple threads to simultaneously execute. Debug instructions are commonly used during software development to allow debug operations to take place. However, the debugging of multi-threaded processors presents particular challenges which are not present in non-multi-threaded processors. For example, when debugging multi-threaded processors, there is a need to control execution of selected threads when a debug point is reached in a given thread.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 6 shows, in a tabular form, functionality of a portion of the external debug control register of FIG. 5, in accordance with one embodiment of the present invention FIG. 7 is a diagram illustrating an exemplary debug instruction capable of execution by the processor of FIG. 2.

FIG. 8 is a diagram of a debug status/control register associated with the debug registers of FIG. 3, in accordance with one embodiment of the present invention.

FIG. 9 shows, in a tabular form, functionality of a portion of the debug status/control register of FIG. 7, in accordance with one embodiment of the present invention.

DETAILED DESCRIPTION

Figure 1:
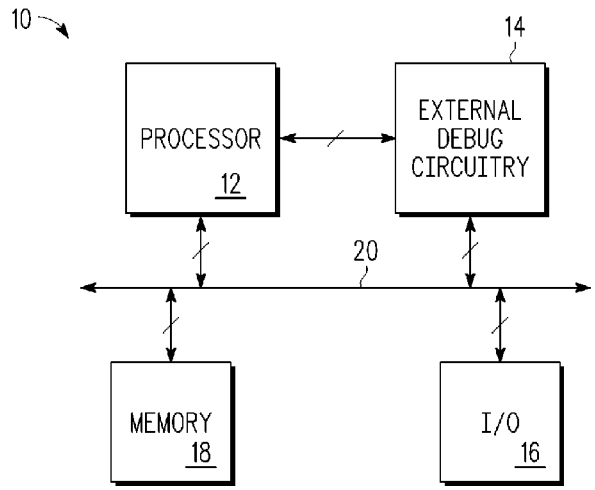
FIG. 1 is a block diagram of a data processing system, in accordance with one embodiment of the present invention.

Multi-threaded data processors allow multiple threads to simultaneously execute. That is, in a multi-threaded processor, a first set of instructions corresponding to a first thread and a second set of instructions corresponding to a second thread can both be executed, where execution of the first set of instructions and the second set of instructions can overlap. Currently, there is a need for improved thread control for debug purposes. In one embodiment, a new debug instruction, dnht, provides a bridge between the execution of instructions on a multi-threaded processor in a non-halted mode, and the software debug monitor or an external debug facility. For example, the dnht instructions allows software to send a debug event to one or more threads on a processor, or to transition one or more threads on a processor from a running state to a halted state, and to notify the external debugger with both a message passed to the external debugger, and bits reserved in the instruction itself which may be used to pass additional information. In one embodiment, dnht provides a mechanism to signal one or more threads with a debug event, and, in response, for those threads to either be halted (or the entire processor may be halted) or to receive a debug event to be processed as a debug interrupt (in internal debug mode) if debug events are enabled for the thread (that is, debug events may be enabled or disabled for each individual thread of a multi-threaded processor).

In one embodiment, the dnht instruction includes an embedded thread specification field, and may also include, in some embodiments, a key specifier. Also, in one embodiment, a dnht control field is used to specify a particular halt operation. Either the instruction's thread field or the contents of a key selected by a key specifier in the instruction may be utilized to specify which thread or threads are to be sent a debug event and cause either a halt operation as indicated by the dnht control field, or a software-based debug interrupt to occur for those specified threads. Therefore, the dnht instruction allows code running on one thread to cause debug activity to occur in selected threads on the processor in close synchronization to the execution of the dnht instruction in that particular thread.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one.

Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" preceding a number indicates that the number is represented in its binary or base two form.

FIG. 1 illustrates a data processing system 10 consistent with an embodiment of the invention. Data processing system 10 may be a system-on-chip. Data processing system 10 may be implemented on a single integrated circuit or on a plurality of integrated circuits. Data processing system 10 includes a processor 12, an external debug circuitry 14, an I/O module 16, and a memory 18, which may be coupled via bus 20. In alternate embodiments, memory 18 may be any type of memory and may be located on the same integrated circuit as processor 12, or on a different integrated circuit than processor 12. Memory 18 may be any type of memory, such as, for example, a read only memory (ROM), a random access memory (RAM), non-volatile memory (e.g. Flash), etc. Also, memory 18 may be a memory or other data storage located within another peripheral or slave or on a different integrated circuit. External debug circuitry 14 may be contained on the same integrated circuit as processor 12, or may be implemented as a separate system independent of the integrated circuit or system-on-chip containing processor 12. In alternate embodiments, bus 20 may be any type of suitable interconnect, including a crossbar, point-to-point connections, an interconnect hierarchy, or any type of suitable interconnection mechanism.

Figure 2:
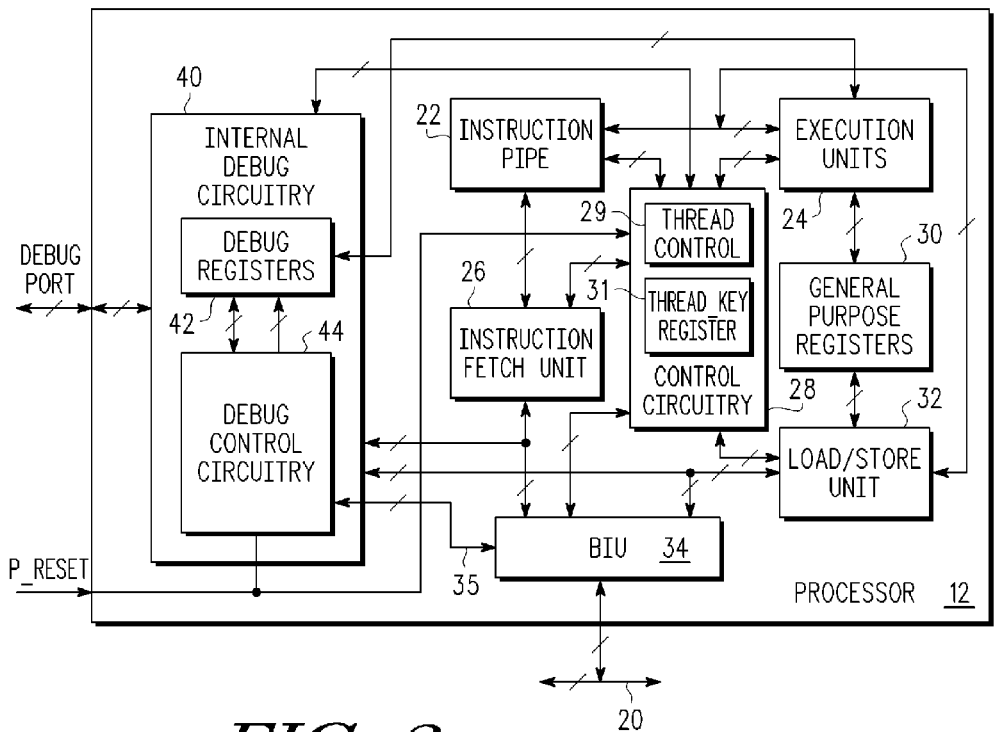
FIG. 2 is a block diagram of a multi-threaded processor associated with the data processing system of FIG. 1, in accordance with one embodiment of the present invention.

FIG. 2 is a block diagram of processor 12 associated with data processing system 10 of FIG. 1. Processor 12 may include an instruction pipe 22, execution units 24, instruction fetch unit 26, control circuitry 28, general purpose registers 30, load/store unit 32, bus interface unit (BIU) 34 and internal debug circuitry 40. Control circuitry 28 includes thread control 29 and thread_key register 31. Processor 12 may communicate with other components of data processing system 10 via bus 20 coupled to BIU 34. Internal debug circuitry 40 may be coupled to external debugging units, such as an IEEE ISTO-5001 compliant Nexus™ debugging unit via a debug port shown in FIG. 2. External debugging units may include all or a portion of external debug circuitry 14 of FIG.1. Nexus™ is a trademark of Freescale Semiconductor, Inc. located in Austin, Tex. Debug port may be a serial interface, such as JTAG, or may be implemented as a parallel port, a combination of serial and parallel ports, an Ethernet port, or as a set of interface signals to on-chip or off-chip circuitry. Internal debug circuitry 40 may include debug registers 42 and debug control circuitry 44. Debug registers 42 may include bits grouped in fields for controlling various debug related events, including instruction breakpoints, data breakpoints, watchpoints, and other messaging and events associated with debugging. These debugging resources may be shared between processor 12 and external debug circuitry 14.

Figure 3:
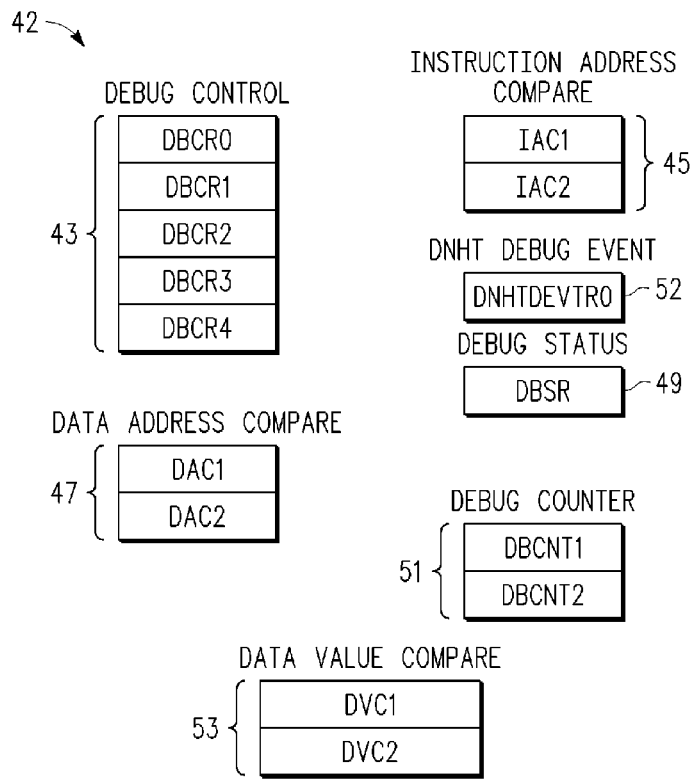
FIG. 3 is a diagram illustrating exemplary debug registers associated with the data processing system of FIG. 1.

Referring now to FIG. 3, registers within debug registers 42 may also be provided for storing one or more address comparison values, address ranges, and data match values for implementing instruction and/or data access breakpoint and watchpoint events, and other debug control criteria. These address and data values, along with various control criteria, are used to determine when processor 12 accesses one or more predetermined instruction addresses or data addresses for the purpose of generating a breakpoint or watchpoint event, which can cause processor 12 to begin exception processing for a debug exception when internal debug mode is active, cause processor 12 to enter a debug halted mode in which it responds to commands provided by external debug circuitry 14 through the debug port of internal debug unit 40 when external debug mode is active, or may cause processor 12 to halt or interrupt one or more selected threads. By way of example, debug registers 42 may include various debug control registers, including debug control registers 43 (DBCR0, DBCR1, DBCR2, DBCR3, and DBCR4). These debug control registers may be used to store various types of debug configuration information. Debug registers 42 may further include instruction address compare registers 45 (IAC1 and IAC2). Instruction address compare registers 45 may store instruction addresses for address comparison purposes. Debug registers 42 may further include data address compare registers 47 (DAC1 and DAC2). Data address compare registers 47 may store data access addresses for address comparison purposes. Debug registers 42 may further include DNHT debug event register 52 (DNHTDEVTR0), debug status register 49, debug counters 51 (DBCNT1 and DBCNT2), and data value compare registers 53 (DVC1 and DVC2). Debug registers 42 may be a part of the user's software programming model. Debug counters 51 may be configured to count-down when one or more count-enabled events occur. When a count value reaches zero, a debug count event may be signaled, and a debug interrupt may be generated, if enabled. Data value compare registers 53 may store data values for data comparison purposes.

In internal debug mode, these register resources are managed by software, and no external debug circuitry usage is required. Software may configure the registers through data movement using move to and from special purpose register instructions which are software instructions to initialize the individual debug registers for performing software-based debugging activities, in which enabled debug events cause software debug interrupts to occur (if interrupts are enabled). A software interrupt handler may then perform various desired activity which is determined by the software programmer of data processing system 10.

Figure 4:
FIG. 4 is a diagram illustrating exemplary external debug registers associated with the data processing system of FIG. 1.

In external debug mode, external debug circuitry 14 may be assigned ownership of the shared debug registers of debug registers 42, and when a configured debug event occurs, processor 12 may enter a halted state and wait for a command to be provided by external debug circuitry 14 via the debug port. Software no longer has control of the shared debug resources when external debug mode is enabled. Also, as illustrated in FIG. 4, debug registers 42 may include various external debug control registers 50, such as EDBCR0 and EDBCR1. Unlike the registers of FIG. 3, the registers of FIG. 4, which may be located within debug registers 42 or elsewhere within processor 12, are not part of the user's software programming model. That is, software executing on processor 12 does not have visibility of external debug control registers 50. External debug circuitry 14 may access the shared debug resources and any dedicated external debug resources (such as external debug control registers 50) directly via the debug port (as shown in FIG. 2). The debug port of FIG. 2 may be, for example, implemented as a JTAG TAP port. In one embodiment, debug registers 42 and external debug control registers 50 may be mapped as JTAG data registers with register selection encodings contained within one or more fields for the various JTAG instructions, which provide for read and write accesses to the registers by the debugger through JTAG IR and DR operations. Alternate embodiments may use other protocols for signaling and mapping or selection of registers.

Sharing of a set of registers requires fewer processor 12 resources to be implemented, and this may simplify the programming model for the user of data processing system 10. Internal debug circuitry 40 monitors activity within processor 12 and in response to detecting one or more predetermined conditions based on stored debug configuration information present within debug registers 42 or elsewhere within processor 12, may generate one or more data breakpoint events, instruction breakpoint events, instruction execution events such as a branch or trap taken event, an instruction completion event, and the like. In this manner of operation, processor 12 functions as can be appreciated by those skilled in the art.

Figure 5:
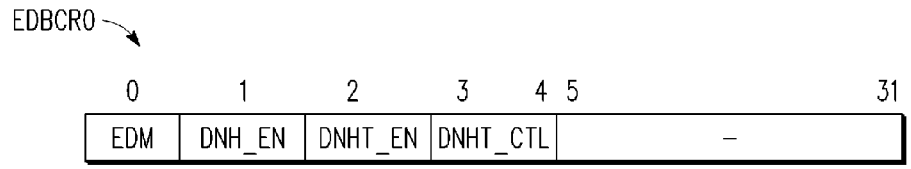
FIG. 5 is a diagram of an external debug control register associated with the external debug registers of FIG. 4, in accordance with one embodiment of the present invention.

FIG. 5 is a diagram of an external debug control register, EDBCR0, associated with the data processing system of FIG. 1, in accordance with one embodiment. EDBCR0 may be included as part of external debug control registers 50, which may or may not be a part of debug registers 42 within internal debug unit 40, but which are not directly accessible by software executing on processor 12. EDBCR0 may be used to store debug configuration information for use when debugging with an external debugger (e.g. external debug circuitry 14). Although FIG. 5 illustrates a specific embodiment of the present invention which uses specific fields, alternate embodiments of the present invention may use different fields having different numbers of bits in each field. The specific fields depicted in FIG. 5 are shown only for illustrative purposes. By way of example, EDBCR0 may include 32 bits. EDBCR0 may include various fields, including an EDM bit field, a DNH_EN bit field, a DNHT_EN bit field, and a DNHT_CTL multiple bit field. These fields are merely exemplary and EDBCR0 may include fewer or additional fields. In addition, these fields may be arranged differently and may include a different number of bits, as needed. EDBCR0 may also include reserved bit fields 5 to 31, which may be used in the future or may be used to provide additional functionality. By way of example, EDBCR0 may be a register that is only writeable by external debug circuitry via the debug port, where the external debug circuitry is located external to processor 12 but may be on a same or different integrated circuit as processor 12. By way of example, EDBCR0 is not a control register in the user's software programming model. Any type of storage circuitry located within or external to processor 12 may be used to implement EDBCR0. Alternatively, one or more other external debug control registers (such as within external debug control registers 50) may include one or more of the fields of EDBCR0 rather than EDBCR0.

FIG. 6 shows, in a tabular form, functionality of a portion of EDBCR0 of FIG. 5, in accordance with one embodiment. EDM is a bit field used to indicate whether external debug mode is enabled or disabled (and may therefore be referred to as an external debug mode enable field) In one embodiment, when external debug mode is disabled, internal debug mode is considered enabled. (Alternatively, a separate enable field for internal debug mode may be used, such as, for example, within DBCR0.) In one example, when the EDM field is set (e.g., has a binary value of 1), processor 12 operates in external debug mode and when the EDM field is cleared (e.g., has a binary value of 0), processor 12 operates in internal debug mode. When the EDM bit is set to 1, for example, control registers, such as DBCR0-4, along with other debug registers are placed under exclusive control of external debug circuitry 14 and data processing system 10 software cannot write information to these control registers. Also, when the EDM bit is set to 1, a qualified debug condition will generate an external debug event by updating a corresponding bit in an external debug status register (e.g. EDBSR0, not shown) and cause the processor to halt. In one embodiment, which uses a separate enable field for internal debug mode, setting of the EDM bit to 1 takes precedence over the internal debug mode enable field.

Still referring to FIG. 6, DNH_EN is an enable field which indicates how a debug notify halt (dnh) instruction will operate. For example, when DNH_EN is cleared (e.g., has a binary value of 0), execution of a dnh instruction will result in a debug exception, which, if interrupts are enabled, will result in a debug interrupt. When DNH_EN is set (e.g., has a binary value of 1), execution of a dnh instruction will cause the processor to halt (at which point, for example, external debug circuitry 14 can provide debug commands via the debug port). Note that a dnh instruction does not include any thread information such that execution of a dnh instruction in any thread (when DNH_EN is set) causes processor 12 to halt, such that all active threads are halted. That is, a dnh instruction does not provide any mechanism for controlling individual threads or groups of threads during debug.

Still referring to FIG. 6, DNHT_EN is an enable field which indicates how a dnht instruction will operate. For example, when DNHT_EN is cleared (e.g., has a binary value of 0), execution of the a dnht instruction, in any thread, will result in a debug exception, which, if interrupts are enabled, will result in a debug interrupt in each selected thread which is active and has its corresponding flag bit set in the DNHTEVTR0, as will be described in more detail below). When DNHT_EN is set (e.g., has a binary value of 1), execution of a dnht instruction will cause a halting operation as indicated by the DNHT_CTL field. For example, execution of the dnht instruction may cause the processor or selected threads to halt, based on the settings of DNHT_CTL. As will be described below in reference to FIG. 7, the dnht instruction may directly or indirectly identify or select a particular subset of threads.

Still referring to FIG. 6, DNHT_CTL is an action control field which indicates a halting operation (also referred to as a halting function or halting action) to be performed if DNHT_EN is set (e.g. has a binary value of 1). In the illustrated embodiment, DNHT_CTL is a two-bit field. If the binary value of the field is 00, any set bit in DNHTDEVTR0 will cause the processor to halt. If the binary value of the field is 01, a set bit in DNHTDEVTR0 will cause the processor to halt only if the corresponding thread is active or when the corresponding thread becomes activated. If the binary value of the field is 10, the dnht instruction will cause the processor to suspend normal thread activation of a thread whose flag bit is set in DNHTDEVTR0 and will instead notify the external debugger of the event at the time the thread would have been activated. If the thread is currently active, it becomes dormant, and the external debugger is notified. The processor continues to remain active for all threads which do not have their corresponding flag bit set in DNHTDEVTR0. In the illustrated embodiment, the binary value of 11 for the field is reserved. Note that in alternate embodiments, different halting operations may be defined by DNHT_CTL, and different binary values may be used to indicate the halting operations. Also, in alternate embodiments, the DNHT_CTL field may be implemented using more or fewer bits, as needed.

In one embodiment, operation of a dnh or dnht instruction is defined by the DNH_EN and DNHT_EN fields, respectively, as described above, regardless of whether processor 12 is operating in internal or external debug mode (i.e., regardless of the value of EDM). In this manner, the dnh and dnht can result in a processor halt (or other halting operation, as defined by the DNHT_CTL field in the case of a dnht instruction) even when in internal debug mode such that external debug circuitry can debug processor 12 while processor 12 is operating in internal debug mode. However, in an alternate embodiment, when external debug mode is not enabled (when EDM is cleared to 0), a dnh or dnht instruction will always generate an illegal instruction exception (and DNH_EN and DNHT_EN are ignored). In this alternate embodiment, the values of DNH_EN and DNHT_EN determine operation of the dnh and dnht instructions, respectively, only in external debug mode (when EDM is set to 1). The descriptions that follow, though, assume that operation of a dnh or dnht instruction is defined by the DNH_EN and DNHT_EN fields, respectively, regardless of the modes, such that the values of DNH_EN and DNHT_EN need not be qualified by the value of EDM.

FIG. 7 illustrates a debug notify halt thread(s) (dnht) instruction where, in one embodiment, execution of the dnht instruction causes the processor to perform a halting operation selected by the DNHT_CTL field if the external debug facility has enabled such action (e.g. by setting DNHT_EN to 1). When processor 12 or one or more selected threads in processor 12 is halted, the contents of the dui field are sent to the external debug facility (e.g. external debug circuitry 14) to identify the reason for the halt. The selected threads may be indicated directly or indirectly via a thread_select field by the dnht instruction. In one embodiment, the thread_select field is an 8 bit field, in which a set bit within the field identifies a corresponding thread of processor 12. For example, in one embodiment, processor 12, via thread control 29, can be executing up to 8 threads (thread 0 through thread 7), where each bit in the thread_select field corresponds to one of the 8 threads. For example, from right to left, each bit may correspond to thread 0 through thread 7, respectively. In this manner, when a particular bit of the thread_select field is set (e.g. has a binary value of 1), then the corresponding thread is selected or identified. For example, a value of 00000001 for the thread_select field may indicate that thread 0 is selected, and a value of 00001101 may indicate threads 0, 2, and 3 are selected. Therefore, the thread_select field can directly indicate which threads are selected. In one embodiment, if the thread_select field of the dnht instruction has a value of 00000000, then the threads may be indirectly selected by thread_key register 31. That is, thread_key register 31 may include 8 bits which select one or more threads in a manner similar to the thread_select field. Note that in alternate embodiments, the thread_select field and the thread_key register may use different formats, such as other encoded formats, to select one or more threads or groups of threads. Also, note that thread_key register 31 may be included anywhere within processor 12 or system 10. Alternatively, thread_key register 31 may not be used by the dnht instruction and thus not be present in processor 12. Use of thread key register 31 allows for the selected threads to be affected by execution of a particular instance of a dnht instruction to be determined or modified, without changing the binary value of the dnht instruction, and as such may provide a more flexible mechanism for debugging, since for some embodiments, the instruction codes may not be readily modified, such as when executing from a read-only memory (ROM, OTP, EPROM, EEROM, etc.).

Note that if the DNHT_EN bit has not been previously set by the external debug facility (e.g. external debug circuitry 14), executing the dnht instruction produces a debug event exception for the selected threads selected by the thread_select field or by thread_key register 31. Debug event exceptions will cause thread software to be interrupted if debug interrupts are enabled, and a debug event is present for a corresponding active thread.

The dnht instruction illustrated in FIG. 7 may use any variety of different formats and may include other fields, in addition to the opcode (e.g. bits 0 to 5 of the dnht instruction), subopcode (e.g. bits 21-30 of the dnht instruction), and thread_select (e.g. bits 13-20 of the dnht instruction). For example, as illustrated in FIG. 7, the dnht instruction also includes a dui field. For example, if processor 12 is halted in response to a dnht instruction, the dui field may be sent to the external debug circuitry to identify the reason for the halt.

FIG. 8 is a diagram of dnht debug event register (DNHT-DEVTR0) 52, associated with the data processing system of FIG. 1. Although FIG. 8 illustrates a specific embodiment of the present invention which uses specific fields, alternate embodiments of the present invention may use different fields having different numbers of bits in each field. The specific fields depicted in FIG. 8 are shown only for illustrative purposes. By way of example, DNHTDEVTR0 may include 32 bits. DNHTDEVTR0 may include various fields, including bit event control fields such as event_thread 7, event_thread 6, event_thread 5, event_thread 4, event_thread 3, event_thread 2, event_thread 1, and event_thread 0. These fields are merely exemplary and DNHTDEVTR0 may include fewer or additional fields. In addition, these fields may be arranged differently. DNHTDEVTR0 may also include reserved bit fields 0 to 23, which may be used in the future or for other functions. Any type of storage circuitry may be used to implement DNHTDEVTR0.

DNHTDEVTR0 may be included as part of debug registers 42, which may be located within internal debug unit 40. DNHTDEVTR0 may be used to control the debug facility and in particular, to enable specific actions to occur during execution of a dnht instruction. DNHTDEVTR0 may be used to hold posted debug events for individual threads. When a bit is set in DNHTDEVTR0, the thread associated with that event may enter a debug halted mode as defined by DNHT_CTL if DNHT_EN is set to 1. Otherwise, if DNHT_EN is cleared to 0, the set bit in DNHTDEVTR0 will cause a debug exception to occur for the thread (and cause an interrupt, if interrupts are enabled). Hardware sets selected bits in DNHTDEVTR0 based on the execution of the dnht instruction. (Note that the bits in DNHTDEVTR0 may be referred to as flag bits which are set based on the execution of the dnht instruction.) For example, when a dnht instruction is executed in a particular thread, a bit (i.e. a flag bit) in DNHTDEVTR0 corresponding to each thread selected by the thread_select field of the dnht instruction (or by thread_key register 31) is set in order to post events in the selected one or more threads. (Note that, in some cases, no threads are selected by the dnht instruction. In this case, execution of a dnht instruction does nothing, i.e. may operate as a no operation, NOP, instruction.)

FIG. 9 shows, in a tabular form, functionality of a portion of DNHTDEVTR0 of FIG. 8. Event_thread 7 is a one-bit field which is used to indicate whether a thread 7 event has been posted. For example, a binary value of 0 may indicate that no thread 7 event has been posted, and a binary value of 1 may indicate that a thread 7 event has been posted. Event_thread 6 is a one-bit field which is used to indicate whether a thread 6 event has been posted. For example, a binary value of 0 may indicate that no thread 6 event has been posted, and a binary value of 1 may indicate that a thread 6 event has been posted. Event_thread 5 is a one-bit field which is used to indicate whether a thread 5 event has been posted. For example, a binary value of 0 may indicate that no thread 5 event has been posted, and a binary value of 1 may indicate that a thread 5 event has been posted. Event_thread 4 is a one-bit field which is used to indicate whether a thread 4 event has been posted. For example, a binary value of 0 may indicate that no thread 4 event has been posted, and a binary value of 1 may indicate that a thread 4 event has been posted. Event_thread 3 is a one-bit field which is used to indicate whether a thread 3 event has been posted. For example, a binary value of 0 may indicate that no thread 3 event has been posted, and a binary value of 1 may indicate that a thread 3 event has been posted. Event_thread 2 is a one-bit field which is used to indicate whether a thread 2 event has been posted. For example, a binary value of 0 may indicate that no thread 2 event has been posted, and a binary value of 1 may indicate that a thread 2 event has been posted. Event_thread 1 is a one-bit field which is used to indicate whether a thread 1 event has been posted. For example, a binary value of 0 may indicate that no thread 1 event has been posted, and a binary value of 1 may indicate that a thread 1 event has been posted. Event_thread 0 is a one-bit field which is used to indicate whether a thread 0 event has been posted. For example, a binary value of 0 may indicate that no thread 0 event has been posted, and a binary value of 1 may indicate that a thread 0 event has been posted.

In one embodiment, when a dnht instruction is executed in a particular thread, then hardware sets the event_thread field of DNHTDEVTR0 corresponding to each thread, if any, selected by the dnht instruction. In one embodiment, circuitry within debug control circuitry 44 monitors DNHTDEVTR0 to know when an event or events have been posted. (Note that an event may be posted in DNHTDEVTR0 each time a dnht instruction is executed.) When a thread event has been posted, then the thread event either causes a halting operation as defined by DNHT_CTL (if DNHT_EN is 1) or may cause a debug exception (if DNHT_EN is 0). Furthermore, the debug exception causes a debug interrupt when debug interrupts are enabled.

In one embodiment, when DNHT_EN is 0, the dnht instruction allows any thread to cause debug exceptions in one or more threads (including itself), where these debug exceptions occur simultaneously, or almost simultaneously. For example, if any thread executes a dnht instruction, any thread selected by the thread_select field of the dnht instruction (or by the thread_key register) receives a debug exception, and if debug interrupts are enabled, then any of the selected threads which are currently active will take a debug interrupt. If a selected thread is inactive at the time it receives a debug exception, the selected thread will take an interrupt upon becoming active. Therefore, in one embodiment, when a dnht instruction is executed (in any thread), the DNHT-DEVTR0 register is updated to post events in the one or more threads, if any, selected by the dnht instruction. Note that the dnht instruction execution in one particular thread can select one or more threads other than itself or may include itself as a selected thread. For each selected thread that is active, if debug interrupts are enabled in that thread, normal execution flow of that thread is stopped such that a debug interrupt can be taken. A debug interrupt handler can then execute in that thread to service the debug interrupt. Therefore, in each active thread which takes an interrupt, the interrupts will be taken simultaneously, or close to simultaneously. That is, a thread which takes an interrupt may be in an uninterruptible state (such as, e.g., in the process of executing a multi-cycle instruction) at the point the debug exception is posted and therefore waits until a interruptible state is reached. However, in one embodiment, this occurs within a small number of cycles from the time the debug exception is posted. For example, in one embodiment, closely simultaneous may refer to occurring within no more than 10 cycles of each other.

As discussed above, when DNHT_EN is set to 1 and a dnht instruction is executed, a halting operation is performed, as indicated by DNHT_CTL. When DNHT_CTL is set to 10, the selected threads selected by the dnht instruction (which may be any one or more of threads 0-7, including itself) are "halted". That is, in one embodiment, debug halted mode is emulated in the selected threads such that from the perspective of the selected threads, it looks like processor 12 is halted. External debug circuitry 14 can then access any halted thread. Threads which are not selected by the dnht instruction are not halted. That is, processor 12 continues to remain active for all threads which were not selected, i.e. which did not post an event in DNHTDEVTR0. In one embodiment, debug halted mode for a selected thread is emulated by precluding the selected thread from being activated by thread scheduler 29 (i.e., activation of the selected thread is suspended). That is, thread scheduler 29 may activate each of threads 0-7 in a variety of different ways, as known in the art. For example, thread scheduler 29 may provide a predetermined amount of time to each thread, in a round robin fashion. However, when DNHT_CTL is set to 10, upon execution of a dnht instruction (assuming DNHT_EN=1), and posting of a debug event in DNHTEVNTR0 for a particular thread(s), thread scheduler 29 is prevented from activating any of the threads which has an event posted in DNHTDEVTR0. Furthermore, in one embodiment, upon halting a thread, a debug event or message or other indicator is sent to external debug circuitry 14 to notify external debug circuitry 14 that one or more threads were halted. In one embodiment, this notification of a debug event to external debug circuitry 14 is sent at the time when the one or more threads would have been activated by thread scheduler 29. If a selected thread is currently active, it is halted by thread scheduler 29 by placing it in a dormant state. Upon doing so, notification of the debug event is sent to external debug circuitry. Through these notifications of a debug event, external debug circuitry 14 has knowledge that one or more threads tried to enter debug mode or were placed in a dormant state where thread scheduler 29 is no longer scheduling the one or more threads because they are "halted". Note that external debug circuitry 14 receives this information because when only a subset of all threads is halted, processor 12 itself is not actually halted, and thus does not enter debug mode, as is the case in response to execution of the dnh instruction when DNH_EN is set to 1.

When DNHT_EN is set to 1 and a dnht instruction is executed in any thread and DNHT_CTL is set to 01, processor 12 is halted and enters debug mode when at least one of the threads selected by the dnht instruction is active or becomes active. That is, in this case, unlike the embodiment described above, particular threads are not halted. Instead, if any active thread has an event posted in DNHTDEVTR0, or when a thread which has an event posted in DNHTDEVTR0 becomes active, then processor 12 itself is halted and enters debug mode, at which point external debug circuitry 14 takes control, as occurs in response to execution of a dnh instruction when DNH_EN is 1.

When DNHT_EN is set to 1 and a dnht instruction is executed in any thread and DNHT_CTL is set to 00, processor 12 is halted and enters debug mode. That is, in this embodiment, note that the dnht instruction operates similar to a dnh instruction when DNH_EN is 1.

In one embodiment described above, the halt operation performed upon execution of a dnht instruction with DNHT_EN set to 1 is defined or selected by DNHT_CTL. However, in an alternate embodiment, DNHT_CTL may not be used such that a same halt operation is performed each time a dnht instruction is executed with DNHT_EN set to 1. That is, either the halt operation described for DNHT_CTL being 00, 01, or 10 may always be performed in response to execution of a dnht instruction with DNHT_EN set to 1.

Note that the ability to designate selected threads in thread_key register 31 (for example, by setting the value of the thread_select of a dnht instruction to 0 in the embodiment described above), different threads can be dynamically selected during software execution by writing different values into thread_key register 31. Furthermore, once software development is complete, thread_key register 31 can be cleared such that no threads are selected. In this case, no debug events will be posted in DNHTDEVTR0 such that the dnht instruction do not cause anything to occur (do not cause a thread or processor 12 to be halted and do not cause a debug exception). This, in effect, removes dnht instructions from the software.

Therefore, it should now be understood the dnht instruction can be used to provide increased thread control for debug purposes. For example, the execution of a dnht instruction in any thread may post a debug event to any thread, including itself. Furthermore, when DNHT_EN is 0, the execution of a dnht instruction allows for the posting of debug exceptions simultaneously to DNHTDEVTR0. In this manner, if debug interrupts are enabled, these interrupts may occur simultaneously or within a predetermined number of cycles of each other. Also, when DNHT_EN is 1, the execution of a dnht instruction can cause different halting operations based on the value of DNHT_CTL. In one embodiment, the dnht instruction can select threads for which an event will be posted in DNHTDEVTR0 directly through its thread_select field or indirectly through the use of a thread_key register. In one embodiment, a predetermined value provided in the thread_select field of a dnht instruction redirects the selection of threads to the thread_key register. Through the ability to use a thread_key register, additional flexibility can be provided which allows for the thread selection of a dnht instruction to be modified.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIGS. 1 and 2 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of data processing system 10, for example, from computer readable media such as memory 18 or other media on other computer systems. Such computer readable media may be permanently, removably or remotely coupled to an information processing system such as data processing system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. In a data processing system comprising a processor configured to execute a first set of instructions corresponding to a first thread and a second set of instructions corresponding to a second thread, a method comprising:
debugging the first thread and the second thread, wherein the first set of instructions corresponding to the first thread comprises a debug instruction capable of selecting zero or more threads of the processor, wherein when the debug instruction selects the second thread but not the first thread, the debugging comprises:
in response to execution of the debug instruction by the first thread while executing the first set of instructions, generating a debug event for processing by the second thread, wherein processing the debug event comprises causing a halting operation of the second thread, and wherein execution of the first thread is not halted in response to execution of the debug instruction.

2. The method of claim 1, wherein generating the debug event further comprises posting a debug event to a debug event register.

3. The method of claim 1, wherein generating the debug event further comprises determining whether an external debugger is enabled.

4. The method of claim 3, wherein generating the debug event further comprises generating an instruction exception when the external debugger is not enabled.

5. The method of claim 1 wherein processing the debug event comprises processing a debug interrupt corresponding to the second thread when interrupts are enabled.

6. The method of claim 1, wherein the second thread is selected from a group consisting of a plurality of threads and wherein the second thread is selected based on a thread select field in the debug instruction.

7. The method of claim 6, wherein when the thread select field has a predetermined value, the second thread is selected based on a value stored in a thread key register.

8. The method of claim 2, wherein when the debug event is posted to the debug event register, if the second thread is inactive, the second thread receives a debug interrupt when the second thread becomes active.

9. The method of claim 1, wherein the processor is further configured to execute a third set of instructions corresponding to a third thread, wherein the debug instruction further indicates the third thread, and wherein the method further comprises in response to the execution of the debug instruction by the first thread while executing the first set of instructions, generating a debug event for processing by each of the second thread and the third thread, wherein execution of the first thread is not halted in response to execution of the debug instruction.

10. The method of claim 1, wherein when the debug instruction does not select any thread, execution of the debug instruction results in no operation such that no debug event is generated.

11. The method of claim 1, wherein the halting operation of the second thread comprises precluding the second thread from being activated by a thread scheduler of the processor.

12. The method of claim 1, wherein, in response to execution of the debug instruction by the first thread while executing the first set of instructions, a halting operation is not performed for any thread not indicated by the debug instruction.

13. In a data processing system comprising a processor configured to overlap execution of a first set of instructions corresponding to a first thread and a second set of instructions corresponding to a second thread, a method comprising:
debugging the first thread and the second thread, wherein the first set of instruction of the first thread corresponding to the first thread comprises a debug instruction which indicates zero or more threads of the processor, wherein when the debug instruction indicates the second thread but not the first thread, the debugging comprises:
in response to execution of the debug instruction by the first thread while executing the first set of instructions, generating a debug event for processing by the second thread, wherein processing the debug event comprises causing a halting operation of the second thread, wherein execution of the first thread is not halted in response to execution of the debug instruction, wherein the second thread is selected from a group consisting of a plurality of threads and wherein the second thread is selected based on a thread select field.

14. The method of claim 13, wherein generating the debug event further comprises posting a debug event to a debug event register.

15. The method of claim 13, wherein generating the debug event further comprises determining whether an external debugger is enabled.

16. The method of claim 15, wherein the generating the debug event further comprises generating an instruction exception when the external debugger is not enabled.

17. The method of claim 13 processing wherein processing the debug event comprises processing a debug interrupt corresponding to the second thread when interrupts are enabled.

18. The method of claim 13, wherein the thread select field comprises a portion of the debug instruction encoding and wherein when the thread select field has a predetermined value, the second thread is selected based on a value stored in a thread key register.

19. The method of claim 13, wherein when the debug instruction does not select any thread, execution of the debug instruction results in no operation such that no debug event is generated.

20. The method of claim 13, wherein the halting operation of the second thread comprises precluding the second thread from being activated by a thread scheduler of the processor.

21. The method of claim 13, wherein, in response to execution of the debug instruction by the first thread while executing the first set of instructions, a halting operation is not performed for any thread not indicated by the debug instruction.

22. A data processing system implemented at least partially in hardware comprising:
a processor configured to execute a first set of instructions corresponding to a first thread and a second set of instructions corresponding to a second thread, wherein the first set of instructions corresponding to the first thread comprises a debug instruction which indicates zero or more threads of the processor, the processor further configured, when the debug instruction indicates the second thread but not the first thread, during debugging of the first thread and the second thread and in response to execution of the debug instruction by the first thread while executing the first set of instructions, generating a debug event for processing by the second thread, wherein processing the debug event comprises causing a halting operation of the second thread, and wherein execution of the first thread is not halted in response to execution of the debug instruction.

23. The data processing system of claim 22, wherein the processor further comprises thread control circuitry configured to post a debug event to a debug event register.

24. The data processing system of claim 22, wherein the second thread is selected from a group consisting of a plurality of threads and wherein the second thread is selected based on a thread select field in the debug instruction.

* * * * *